United States Patent
Seo et al.

(10) Patent No.: US 8,077,382 B2
(45) Date of Patent: Dec. 13, 2011

(54) GAIN-CLAMPED OPTICAL AMPLIFYING APPARATUS USING FIBER RAMAN AMPLIFIER HAVING RAMAN CAVITY

(75) Inventors: Hong-Seok Seo, Daejeon (KR); Joon Tae Ahn, Daejeon (KR); Bong Je Park, Daejeon (KR); Woon Jin Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 809 days.

(21) Appl. No.: 12/133,008

(22) Filed: Jun. 4, 2008

(65) Prior Publication Data
US 2009/0046353 A1 Feb. 19, 2009

(30) Foreign Application Priority Data
Jun. 15, 2007 (KR) .................. 10-2007-0059100

(51) Int. Cl.
*H01S 3/00* (2006.01)
(52) U.S. Cl. .................. 359/334; 359/337.1; 359/341.4
(58) Field of Classification Search .................. 359/334, 359/337.1, 341.4
See application file for complete search history.

(56) References Cited

U.S. PATENT DOCUMENTS

| 5,991,068 | A | 11/1999 | Massicott et al. | |
|---|---|---|---|---|
| 6,501,594 | B1 | 12/2002 | Hwang et al. | |
| 7,133,195 | B2 * | 11/2006 | Ahn et al. | 359/337.4 |
| 7,511,881 | B2 * | 3/2009 | Ahn et al. | 359/337.2 |
| 7,738,165 | B2 * | 6/2010 | Ahn et al. | 359/337 |
| 2006/0082865 | A1 * | 4/2006 | Ahn et al. | 359/333 |

FOREIGN PATENT DOCUMENTS

| KR | 10-0201009 | 3/1999 |
|---|---|---|
| KR | 1020010088809 A | 9/2001 |
| KR | 1020030075295 A | 9/2003 |

OTHER PUBLICATIONS

Foreign Notice of Allowance issued on Sep. 29, 2008 in the corresponding KR application 10-2007-0059100.

* cited by examiner

*Primary Examiner* — Mark Hellner
(74) *Attorney, Agent, or Firm* — Rabin & Berdo, P.C.

(57) ABSTRACT

Provided is a gain-clamped (GC) optical amplifier using a fiber Raman amplifier (FRA) having a Raman cavity. The FRA having a Raman cavity comprises a Raman fiber module (RFM) amplifying and outputting an input optical signal and a resonant cavity generating a Raman laser and a gain clamping laser (GC laser), wherein the resonant cavity is formed as a feedback loop between an input terminal and an output terminal of the RFM. Accordingly, a gain of an optical signal propagating along a core of RFM keeps a constant value regardless of input signal intensity by generating the GC laser for gain clamping between a wavelength band of the Raman laser and a gain band of input signals.

14 Claims, 5 Drawing Sheets

GAIN-CLAMPED OPTICAL AMPLIFYING APPARATUS USING FIBER RAMAN AMPLIFIER HAVING RAMAN CAVITY

CROSS-REFERENCE TO RELATED PATENT APPLICATION

This application claims the benefit of Korean Patent Application No. 10-2007-0059100, filed on Jun. 15, 2007, in the Korean Intellectual Property Office, the disclosure of which is incorporated herein in its entirety by reference.

BACKGROUND OF THE INVENTION

1. Field of the Invention

The present invention relates to a gain-clamped optical amplifier, and more particularly, to a gain-clamped optical amplifier using an all-optical method in an optical amplifier structure having a Raman cavity, without any loss of bandwidth.

2. Description of the Related Art

Much research has been conducted on fiber Raman amplifiers (FRAs), which are capable of amplifying optical signals having a wavelength band that cannot be amplified with an erbium-doped fiber amplifier (EDFA), and which are able to improve the performance of the EDFA.

Fiber Raman amplification has advantages in that an amplification bandwidth of an FRA can be continuously expanded by using multi-wavelength pumps and in that a flattening of a Raman gain band can be obtained by controlling the power of each multi-wavelength pump.

Research has been mainly conducted on FRAs of a distributed type, which compensate for a loss of an optical transmission line by pumping the transmission medium. Also, research is being conducted on FRAs of a discrete type similar to EDFAs to be generally used as a lumped type optical amplifier. Efforts have been made to replace EDFAs with FRAs due to the flexibility of the amplification bandwidth of the FRAs.

Recently, researches on FRA based on a laser cavity have been conducted, and their results have been shown its importance in aspects of miniaturization of FRAs by reducing a 10 km length of Raman medium to about 1 Km.

In general optical amplifiers, the optical gain depends on the intensity of signal light. This characteristic increases a bit error rate in an optical communication and deteriorates quality of data communication. Therefore, to solve this problem, a gain-clamped optical amplifier has been employed as a practical optical amplifier.

Two methods are being studied in typical gain clamping techniques. The first one is an all-optical method which passively clamps a gain in an optical way by using laser resonance, and the second one is a method which electrically controls a current of a pumping laser diode according to the intensity of incident light.

Since the second method requires a complex signal processing for gain clamping, much research has been conducted based on the first all-optical method. The all-optical gain clamping technique passively controls the amount of population inversion in a gain medium by generating a laser beam. That is, since a gain of an optical amplifier is proportional to the size of population inversion and the length of a gain medium, the gain of an optical amplifier is clamped according to the intensity of the oscillating laser counteracting the signal intensity.

If optical signals having a low power are introduced in all-optical gain clamped amplifier, power of the laser becomes automatically high so that the signal gain keeps a gain value. On the contrary, if power of the optical signals is high within a limited range, the power of the laser is somewhat reduced and the signal gain still has the same gain value regardless of the signal power. That is, since power competition between the optical signals and the laser is generated in a complementary relationship, a gain clamping of signals is achieved.

FIG. 1 is a schematic diagram illustrating a conventional gain-clamped EDFA having a laser oscillation structure. Referring to FIG. 1, an erbium-doped fiber (EDF) is used as a gain medium, and pumping light and signal light are combined by a wavelength division multiplexing (WDM) optical coupler. In order to obtain gain clamping, a laser cavity is configured with a ring cavity of a feedback loop type connecting an input terminal and an output terminal.

The ring cavity comprises an optical attenuator (ATT), an optical isolator (ISO), and a band pass filter (BPF), to control the laser oscillation.

The BPF sets a wavelength in which the laser oscillation occurs, and the ISO allows oscillation to occur in only one direction in a ring type resonator. This unidirectional oscillation prevents a hole-burning problem in a laser resonator (laser cavity).

The ATT controls an amplification gain of the signal light by controlling a laser power of the laser resonator.

FIG. 2 is a graph illustrating the principles of gain clamping occurring in a conventional gain-clamped optical amplifier structure. Referring to FIG. 2, when an optical signal is input to the gain-clamped optical amplifier, a gain change for a signal power does not occur since the laser power is automatically controlled with a high speed against variations of the signal power.

However, in this structure, since the oscillating laser is formed in an amplification band, a signal bandwidth allowing the gain clamped optical amplifier is reduced as much as a bandwidth of the laser.

SUMMARY OF THE INVENTION

The present invention provides a method of achieving all-optical gain-clamped amplification using a fiber Raman amplifier (FRA) having a resonant cavity without any loss of bandwidth.

According to an aspect of the present invention, there is provided a gain-clamped (GC) optical amplifier using a fiber Raman amplifier (FRA) having a Raman cavity, including a Raman fiber module (RFM) amplifying an input optical signal and outputting the amplified input optical signal; and a ring cavity generating a Raman laser and a gain clamping laser (GC laser) in a feedback loop type, wherein the GC laser operates in a wavelength range between a wavelength of the Raman laser and a gain band of signals.

The GC optical amplifier may further include a pump causing stimulated Raman scattering (SRS) while light passes through the RFM and generating the Raman laser and the GC laser in the ring cavity.

The ring cavity may include optical filters determining wavelengths of the Raman laser and the GC laser.

The optical filters may include a first filter determining the wavelength of the Raman laser in the ring cavity, wherein the Raman laser are generated from pump amplifies optical signals; and a second filter determining the wavelength of the GC laser in a the wavelength range between the wavelength of Raman laser and the gain band of signals.

The second optical filter may include a variable optical attenuator (VOA) adjusting power of the GC laser for the gain clamping in the ring cavity.

The first filter and the second filter may be connected in parallel, and the GC optical amplifier may further include optical couplers splitting or combining input or output from the first or second filter.

According to another aspect of the present invention, there is provided a gain-clamped (GC) optical amplifier based on a fiber Raman amplifier (FRA) with a Raman cavity, including a Raman fiber module (RFM) amplifying an input optical signal and outputting the amplified input optical signal; a Fabry-Perot cavity generating a Raman laser, wherein the cavity is formed by pairs of optical mirrors in the both inner parts of each input terminal and output terminal of the RFM; and a ring cavity generating a gain clamping laser (GC laser), wherein the resonant cavity is formed as a feedback loop between the input terminal and the output terminal of the RFM.

The GC optical amplifier may further include a pump generating the Raman laser from the Fabry-Perot cavity and the GC laser through the feedback loop while the pump light passes through the RFM.

The resonant cavity for the GC laser may include a filter determining the wavelength of the GC laser in a wavelength range between the wavelength of Raman laser and the gain band of signals; and a variable optical attenuator (VOA) adjusting power of the GC laser in the feedback loop.

According to another aspect of the present invention, there is provided a gain-clamped (GC) optical amplifier using a fiber Raman amplifier (FRA) having a Raman cavity, including a Raman fiber module (RFM) amplifying an input optical signal and outputting the amplified input optical signal; a ring cavity generating a Raman laser, wherein the ring cavity is formed as a feedback loop between an input terminal and an output terminal of the RFM; and a Fabry-Perot cavity generating a gain clamping laser (GC laser), wherein the cavity is formed by pairs of optical mirrors in the both outer parts of each input terminal and output terminal of the RFM.

The GC optical amplifier may further include a pump generating the Raman laser and the GC laser while the pump light passes through the RFM.

The ring cavity for the Raman laser may include a filter device determining a wavelength of the Raman laser in the ring cavity wherein the Raman laser generated from the pump amplify optical signals.

The output mirror for the GC laser located in the outer part of the output terminal of RFM may be a reflectance-adjustable variable optical mirror for adjusting the intensity of the GC laser or has a variable attenuation filter characteristic with an optical mirror.

According to another aspect of the present invention, there is provided a gain-clamped (GC) optical amplifier using a fiber Raman amplifier (FRA) having a Raman cavity, including a Raman fiber module (RFM) amplifying an input optical signal and outputting the amplified input optical signal; a Fabry-Perot cavity generating a Raman laser, wherein the cavity is formed by pairs of optical mirrors in the both inner parts of each input terminal and output terminal of the RFM; a Fabry-Perot cavity generating a gain clamping laser (GC laser), wherein the cavity is formed by pairs of optical mirrors in the both outer part of each input terminal and output terminal of the RFM; and a pump being located between the output mirrors of the Raman laser and the GC laser and generating the Raman laser and the GC laser while the pump light passes through the RFM.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining embodiments of the invention with reference to the attached drawings.

Figure 1:
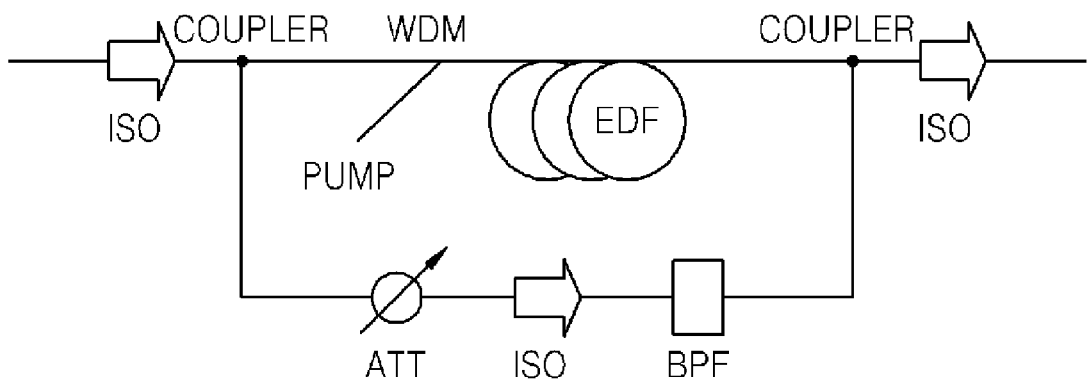
FIG. 1 is a schematic diagram of a conventional gain-clamped erbium-doped fiber amplifier (EDFA) having a laser oscillation structure.
Figure 2:
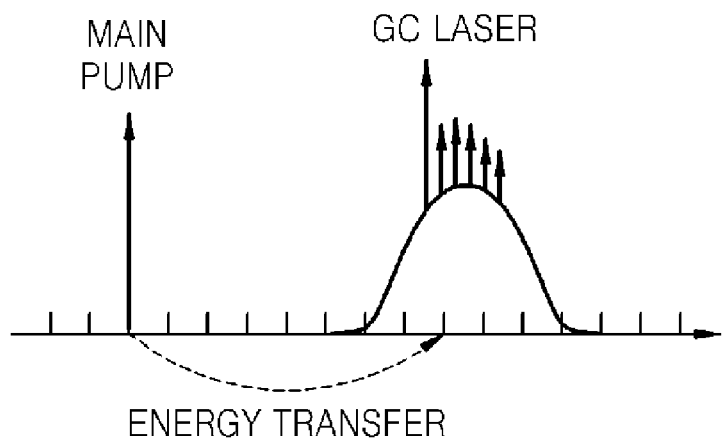
FIG. 2 is a graph illustrating principles of gain clamping occurring in a conventional gain-clamped optical amplifier structure.
Figure 3:
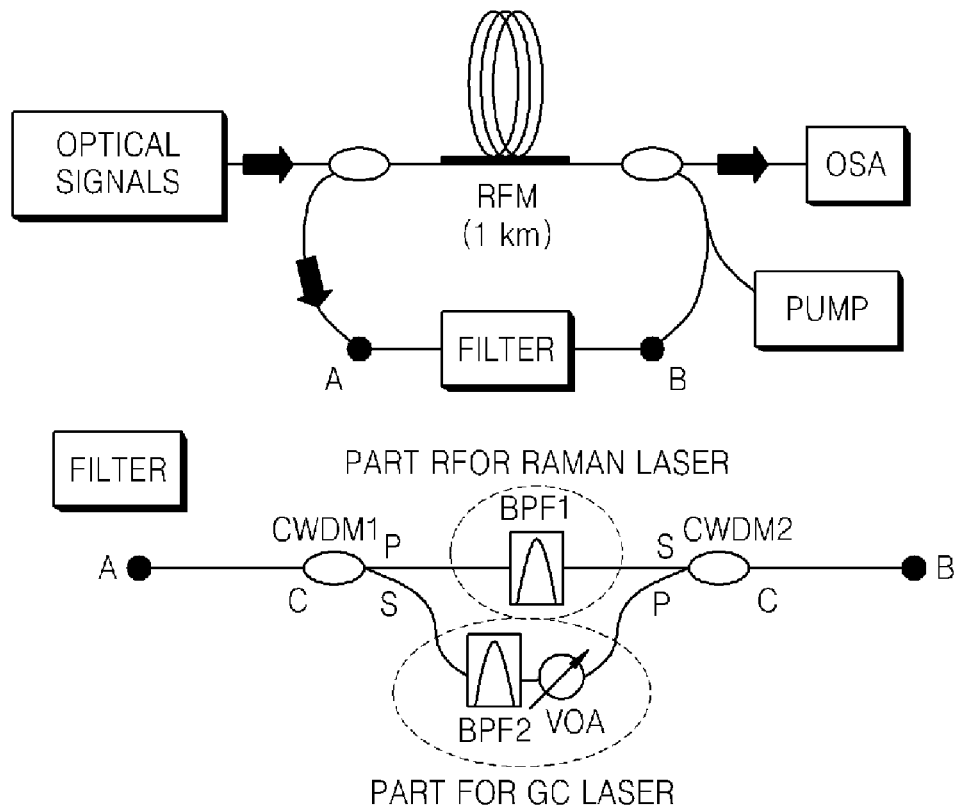
FIG. 3 is a schematic block diagram illustrating an optical amplifier achieving gain clamping in an optical amplifier having a Raman cavity, according to an embodiment of the present invention.

FIG. 3 is a schematic block diagram illustrating an optical amplifier achieving gain clamping in an optical amplifier having a Raman cavity, according to an embodiment of the present invention.

Referring to FIG. 3, a Raman fiber of 1 Km is used as a Raman fiber module (RFM). The RFM amplifies input optical signals by a Raman gain and then outputs the amplified optical signal to an output terminal.

The pump uses a backward pumping scheme for a signal direction so that relative intensity noise (RIN), which is a temporal dithering effect of a pump beam, does not affect the input optical signal.

A feedback loop is formed between the input terminal and the output terminal, thereby forming a resonant cavity to generate a Raman laser and a gain clamping laser (GC laser).

Light from the pump causes stimulated Raman scattering (SRS) in a Raman transition band (a wavelength range that is around 100 nm away from the wavelength of the pump) of the RFM and forms a Raman laser in a resonator formed with a feedback loop.

The Raman laser passes through the RFM in an opposite direction of the optical signal and acts as a pump amplifying the optical signal. That is, the Raman laser is formed from the pump and amplifies the optical signal.

An advantage of this structure is that the length of a Raman fiber can be significantly reduced. In a fiber Raman amplifier (FRA) directly pumped by a pump laser, a Raman medium of around 10 Km is usually required. This long Raman medium makes high double-Rayleigh back scattering, power transient effects occurring when adding/dropping of a multi-wavelength optical signal, high noise factors, etc.

However, in this indirect pumping method, an optical amplifier can be constructed with a Raman medium of around 1 Km, which has much freedom from double Rayleigh scattering, power transient effects, and noise factors.

By using this indirect pumping scheme, optical amplification over 20 dB can be easily achieved even with a relatively short length of a Raman medium because the power of a laser accumulated in a resonator without leakage of energy can be stronger than that of the pumping source.

The present invention suggests a method of achieving new gain clamping in an FRA having a Raman cavity.

An optical filter is placed in the feedback loop as shown in the upper view of FIG. 3.

The optical filter is divided into two parts for different functions.

A band pass filter 1 (BPF1) determines a wavelength of the Raman laser in the resonator, wherein the Raman laser generated from the pump amplifies optical signals as described above.

A band pass filter 2 (BPF2) determines a wavelength of a GC laser so that the proposed FRA has a characteristic of gain-clamped optical amplification.

A laser for gain clamping is not formed in an optical amplification band but is oscillating at a wavelength fixed by the BPF2 in a wavelength range (between a wavelength of Raman laser and a gain band of signals) in which there is no Raman gain.

Conventional Raman amplifiers (i.e., directly pumping scheme of an optical signal) cannot generate a laser in any wavelength region besides a gain band of optical signals.

However, according to an embodiment of the present invention, a Raman laser can be driven in the no-gain band because some energy is transferred from a pump and is added from a newly oscillated Raman laser.

The filter structure illustrated in FIG. 3 comprises coarse wavelength division multiplexers (CWDMs) in which a Raman laser and a GC laser having different wavelengths from each other are separated and combined again. The filter is further divided into the BPF1 determining a wavelength and a linewidth of the Raman laser, the BPF2 determining a wavelength and a linewidth of the GC laser, and a variable optical attenuator (VOA) adjusting power of the GC laser in the resonator.

Figure 4:
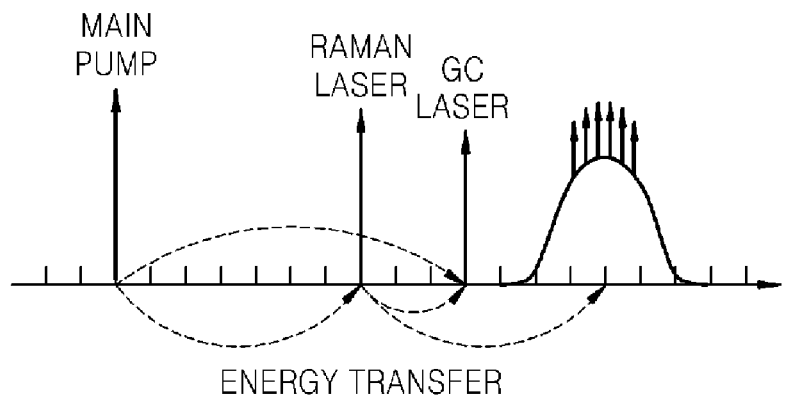
FIG. 4 is a diagram illustrating the principle of gain clamping occurring in an optical amplifier having a Raman cavity, according to an embodiment of the present invention.

FIG. 4 is a graph illustrating the principles of gain clamping occurring in an optical amplifier having a Raman cavity, according to an embodiment of the present invention.

The axis shown in FIG. 4 is a wavelength axis. As illustrated in FIG. 4, a Raman laser is formed near a wavelength band having high SRS which is about 100 nm away from a main pump, and a gain band of signals is formed at a wavelength range which is 100 nm away from the Raman laser. Optical amplification is achieved by inputting an optical signal in the signal gain band.

In order to achieve a clamped gain in the optical amplifier structure, a GC laser is set to have a certain wavelength between the Raman laser and the gain band as illustrated in FIG. 4.

The GC laser starts to oscillate from an energy supplied through SRS from the main pump and the Raman laser.

The detail principles of gain clamping are as follows. When optical signals having a low power enters the proposed amplifier, power of the Raman laser is relatively less exhausted in a Raman medium and circulates constantly in a resonator, and then much energy of the Raman laser is transferred into the GC laser for gain clamping.

Meanwhile, if power of the optical signal is relatively high, most power of the Raman laser is used for optical amplification and is easily exhausted in the Raman medium. In this case, almost no energy is transferred to the laser for gain clamping.

Thus, since energy of the Raman laser is transferred to the GC laser when power of an optical signal is relatively low, optical amplification in the optical signal band is relatively low, and when power of an optical signal is high within a limited value, all energy of the Raman laser is used for optical amplification and the GC laser achieves a low optical power. If the input signal power is over the limited value, the GC laser will be turned off and the gain clamping does not operate any longer in this proposed amplifier. Accordingly, an optical gain is clamped from these principles.

Whereas a conventional GC optical amplifier uses gain saturation for gain clamping by driving a GC laser in a signal band, the proposed GC optical amplifier according to the current embodiment of the present invention clamps an optical signals' gain by a GC laser controlling power of a Raman laser besides the gain band, wherein the Raman laser plays a role as a light source for amplification of optical signals. Another difference is that the GC laser does not occupy the signal band in contrast to conventional GC optical amplifiers. Thus, the GC optical amplifier according to the current embodiment of the present invention is different from conventional GC optical amplifiers in terms of configuration and principles.

Figure 5:
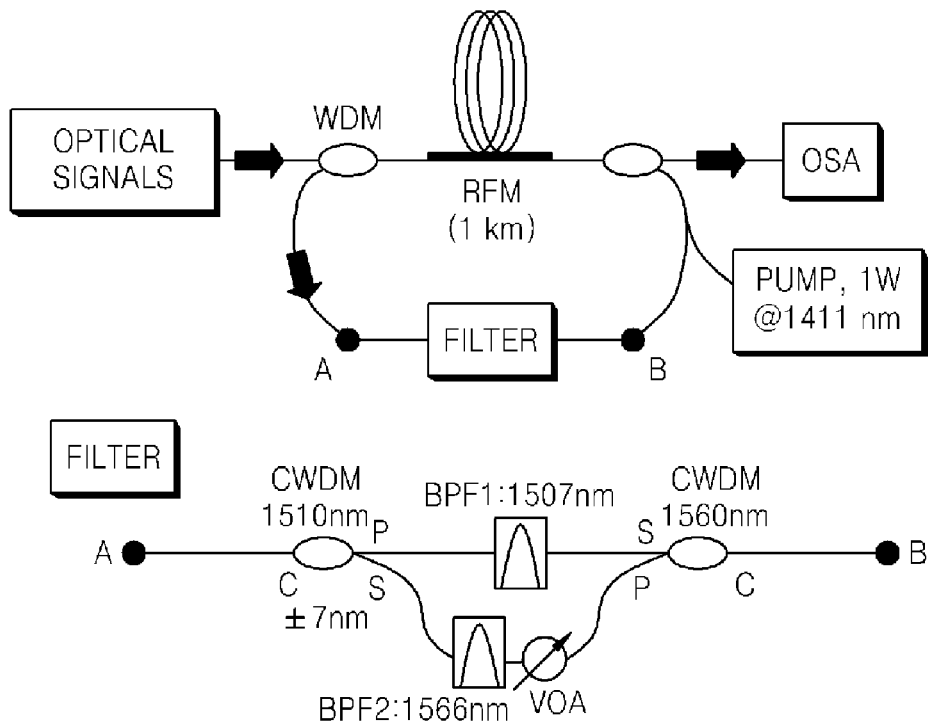
FIG. 5 is a schematic block diagram illustrating a gain-clamped optical amplifier, according to an embodiment of the present invention.

FIG. 5 is a schematic block diagram illustrating a GC optical amplifier, according to an embodiment of the present invention.

Referring to FIG. 5, a wavelength of a pump is 1.411 µm, and its power is 1 W. A band of an optical signal is 1,611 nm~1,650 nm. A length of a Raman medium is 1 Km as illustrated in FIG. 3, and the filter part separates and combines a Raman laser and a GC laser using two CWDM couplers (1,510 nm and 1,560 nm).

A transmission (c to p) port bandwidth of the CWDM couplers is (+/−) 7 nm, and other wavelengths are output via another port (c to s). A central wavelength of a BPF1 for the Raman laser is set to 1,507 nm, and a bandwidth of the BPF1 is 1 nm.

A central wavelength of a BPF2 for GC laser is 1,567 nm, and a bandwidth of the BPF2 is 1 nm. A VOA controls the magnitude of a gain of an optical signal by controlling the intensity of the GC laser.

Figure 6:
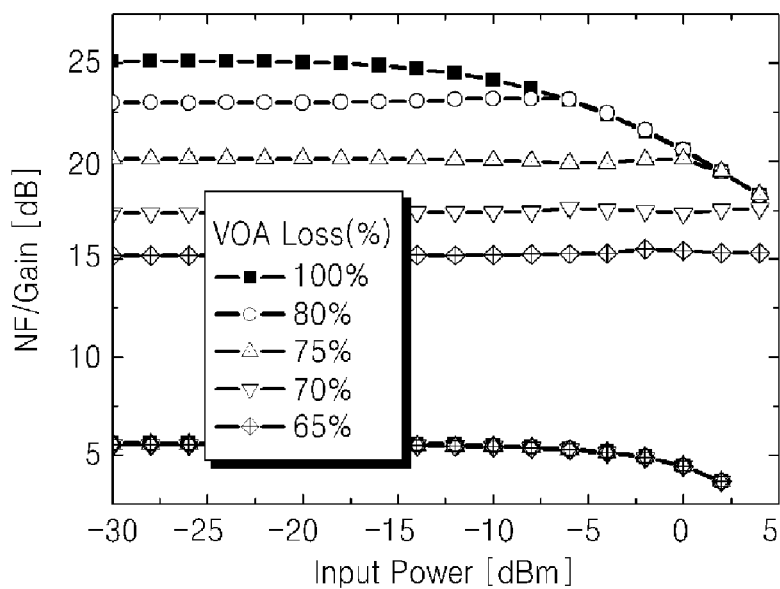
FIG. 6 is a graph illustrating a gain clamping characteristic by simulating the optical amplifier illustrated in FIG. 5, according to an embodiment of the present invention.

FIG. 6 is a graph illustrating a gain clamping characteristic by simulating an optical amplifier, according to an embodiment of the present invention.

Referring to FIG. 6, a wavelength of an optical signal is 1,617 nm, and a gain clamping characteristic according to the intensity of an input optical signal was examined.

A line with black rectangles illustrates the gain clamping characteristic according to the intensity of an input optical signal when a GC laser does not exist (an optical loss of a VOA part of the GC laser is 100%).

Meanwhile, when a loss of the VOA of the GC laser was reduced, the GC laser began oscillating, and a gain clamping behavior was observed in an optical signal band. When a loss of the VOA is 75%, a gain is maintained at 20 dB until the input optical signal reaches 0 dBm.

Thus, when gain clamping is not applied (black rectangles), the gain is changed according to the intensity of an input optical signal. However, by applying the basic principle of the present invention, it can be seen that the gain clamping characteristic is maintained regardless of the intensity of the input optical signal (until the input optical signal reaches 0 dBm).

The noise factor kept the same value when gain clamping is not applied (black line) and when the gain clamping is applied.

Figure 7:
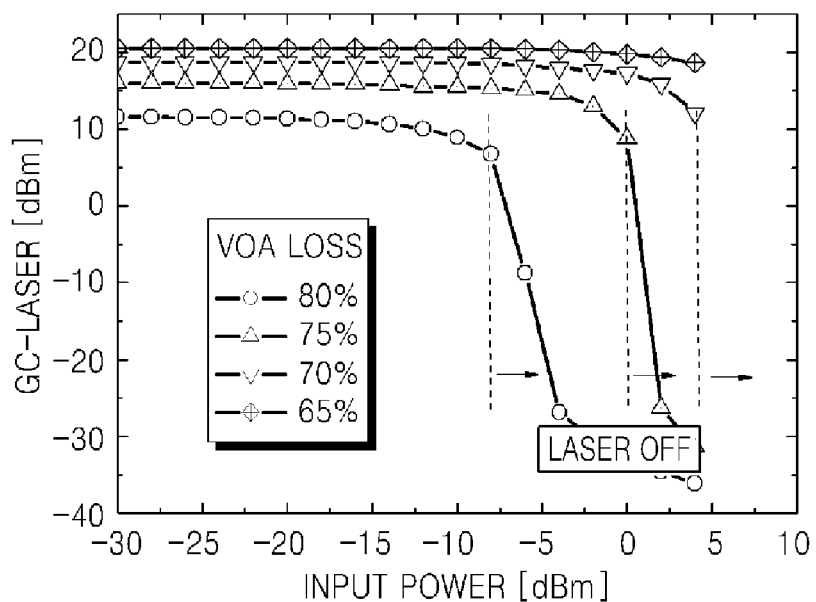
FIG. 7 is a graph illustrating a change in power of a gain clamping laser (GC laser) resulting from a change in power of an input optical signal in an optical amplifier, according to an embodiment of the present invention.

FIG. 7 is a graph illustrating a change in power of a GC laser resulting from a change in power of an input optical signal in an optical amplifier, according to an embodiment of the present invention.

As illustrated in FIG. 7, when a loss of a VOA is 80% and the intensity of an input signal is −5 dBm or greater, a GC laser is off and a gain clamping effect also disappears in a signal band as shown in FIG. 6.

In FIG. 7, if a loss of the VOA is 75%, the GC laser is off when the intensity of the input optical signal is around 2 dBm.

Figure 8:
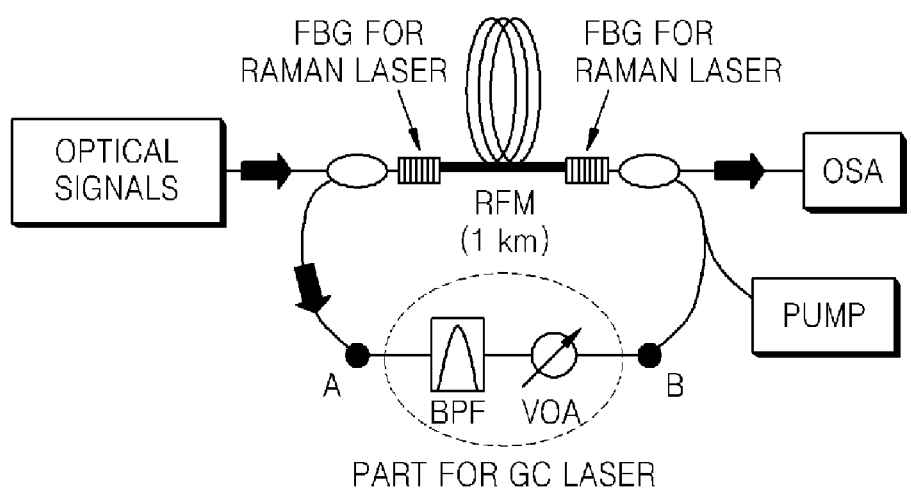
FIG. 8 is a schematic block diagram illustrating an optical amplifier in which a Raman laser is implemented with an optical mirror (or fiber Bragg grating (FBG)), according to an embodiment of the present invention.
Figure 9:
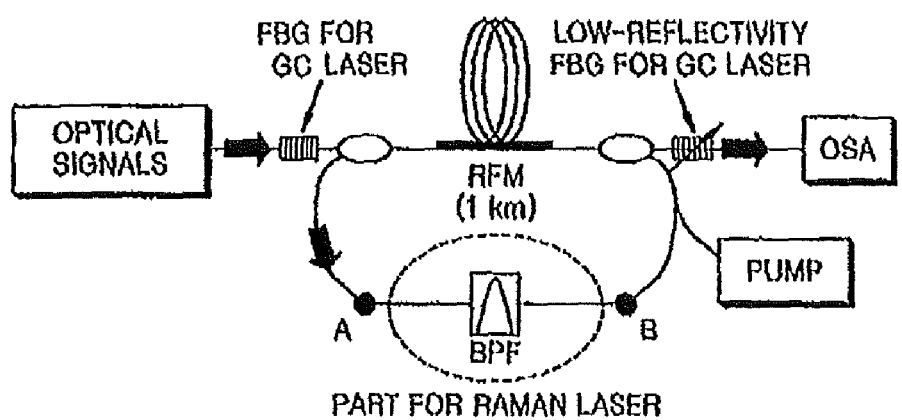
FIG. 9 is a schematic block diagram illustrating an optical amplifier in which a GC laser is implemented with an optical mirror (or FBG), according to an embodiment of the present invention.
Figure 10:
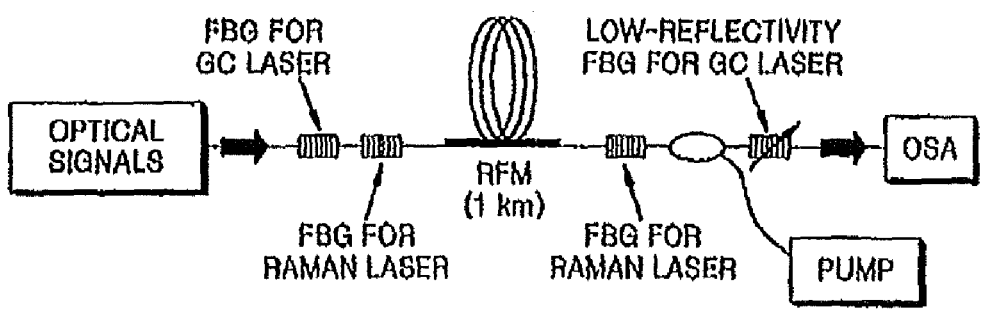
FIG. 10 is a schematic block diagram illustrating an optical amplifier in which both a Raman laser and a GC laser are implemented with an optical mirror (or FBG), according to an embodiment of the present invention.

FIGS. 8 through 10 illustrate optical amplifiers designed in various structures achieving gain clamping in a Raman cavity structure.

FIG. 8 is a schematic block diagram illustrating an optical amplifier in which a Raman laser is implemented with optical mirrors (or fiber bragg grating (FBG)), according to an embodiment of the present invention.

In FIG. 8, the Raman laser is formed with two optical mirrors (or FBGs) instead of a feedback loop, and a GC laser is formed with a feedback loop.

FIG. 9 is a schematic block diagram illustrating an optical amplifier in which a GC laser is implemented with optical mirrors (or FBG), according to an embodiment of the present invention.

In FIG. 9, a Raman laser is formed with a feedback loop, and the GC laser is formed with two optical mirrors (or FBGs).

FIG. 10 is a schematic block diagram illustrating an optical amplifier in which both a Raman laser and a GC laser are implemented with optical mirrors (or FBG), according to an embodiment of the present invention.

In FIG. 10, both the Raman laser and the GC laser are formed with two optical mirrors (or FBGs).

As described above, provided is an optical amplification method of maintaining a uniform gain of an optical signal propagating along a core regardless of the input signal intensity by setting a laser cavity for gain clamping between a wavelength of a Raman laser formed by a pump and a gain band of optical signals amplified by SRS of the Raman laser, which has resonating cavities for the Raman laser and the GC laser, according to an embodiment of the present invention.

Since a conventional gain-clamped optical amplifier uses a portion of an amplification band for gain clamping, a bandwidth of an optical signal is narrower and noise is high in wavelengths adjacent to a wavelength at which a GC laser oscillates.

However, this proposed gain-clamped optical amplifier having a Raman laser cavity does not have a bandwidth loss in a gain band due to gain clamping by forming a GC laser having a wavelength between a wavelength band of a Raman laser formed by a pump and a gain band of optical signals amplified by SRS of the Raman laser without forming an additional laser cavity for the gain clamping in an optical signal band.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A gain-clamped (GC) optical amplifier using a fiber Raman amplifier (FRA) having a Raman cavity, comprising:
   a Raman fiber module (RFM) amplifying an input optical signal and outputting the amplified input optical signal; and
   a ring cavity generating a Raman laser signal and a gain clamping laser signal (GC laser signal) in a feedback loop type,
   wherein the GC laser signal operates in a wavelength range between a wavelength of the Raman laser signal and a wavelength of a gain band of signals.

2. The GC optical amplifier of claim 1, further comprising a pump causing stimulated Raman scattering (SRS) while light passes through the RFM and generating the Raman laser signal and the GC laser signal in the ring cavity.

3. The GC optical amplifier of claim 2, wherein the ring cavity comprises optical filters determining wavelengths of the Raman laser signal and the GC laser signal.

4. The GC optical amplifier of claim 3, wherein the optical filters comprise:
   a first filter determining the wavelength of the Raman laser signal in the ring cavity, wherein the Raman laser signal generated from the pump amplifies optical signals; and
   a second filter determining the wavelength of the GC laser signal in the wavelength range between the wavelength of the Raman laser signal and the wavelength of the gain band of signals.

5. The GC optical amplifier of claim 4, wherein the second optical filter comprises a variable optical attenuator (VOA) adjusting power of the GC laser signal for the gain clamping in the ring cavity.

6. The GC optical amplifier of claim 4, wherein the first filter and the second filter are connected in parallel, and
   the GC optical amplifier further comprises optical couplers splitting or combining input or output from the first or second filter.

7. A gain-clamped (GC) optical amplifier based on a fiber Raman amplifier (FRA) with a Raman cavity, comprising:
   a Raman fiber module (RFM) amplifying an input optical signal and outputting the amplified input optical signal;
   a Fabry-Perot cavity generating a Raman laser signal, wherein said Fabry-Perot cavity is formed by a pair of optical mirrors in inner parts of an input terminal and an output terminal of the RFM; and
   a ring cavity generating a gain clamping laser signal (GC laser signal), wherein the ring cavity is formed as a feedback loop between the input terminal and the output terminal of the RFM.

8. The GC optical amplifier of claim 7, further comprising a pump generating the Raman laser signal from the Fabry- Perot cavity and the GC laser signal through the feedback loop while pump light passes through the RFM.

9. The GC optical amplifier of claim 8, wherein the ring cavity for the GC laser signal comprises:
   a filter determining a wavelength of the GC laser signal in a wavelength range between a wavelength of the Raman laser signal and a wavelength of a gain band of signals; and
   a variable optical attenuator (VOA) adjusting power of the GC laser signal in the feedback loop.

10. A gain-clamped (GC) optical amplifier using a fiber Raman amplifier (FRA) having a Raman cavity, comprising:
   a Raman fiber module (RFM) amplifying an input optical signal and outputting the amplified input optical signal;
   a ring cavity generating a Raman laser signal, wherein the ring cavity is formed as a feedback loop between an input terminal and an output terminal of the RFM; and
   a Fabry-Perot cavity generating a gain clamping laser signal (GC laser signal), wherein said Fabry-Perot cavity is formed by a pair of optical mirrors in outer parts of the input terminal and the output terminal of the RFM.

11. The GC optical amplifier of claim 10, further comprising a pump generating the Raman laser signal and the GC laser signal while pump light passes through the RFM.

12. The GC optical amplifier of claim 11, wherein the ring cavity for the Raman laser signal comprises a filter device determining a wavelength of the Raman laser signal in the ring cavity wherein the Raman laser signal generated from the pump amplifies optical signals.

13. The GC optical amplifier of claim 10, wherein the mirror for the GC laser signal located in the outer part of the output terminal of the RFM is a reflectance-adjustable variable optical mirror for adjusting the intensity of the GC laser signal or has a variable attenuation filter characteristic with an optical mirror.

14. A gain-clamped (GC) optical amplifier using a fiber Raman amplifier (FRA) having a Raman cavity, comprising:
   a Raman fiber module (RFM) amplifying an input optical signal and outputting the amplified input optical signal;
   a Fabry-Perot cavity generating a Raman laser signal, wherein the Fabry-Perot cavity is formed by a pair of optical mirrors in inner parts of an input terminal and an output terminal of the RFM;
   a Fabry-Perot cavity generating a gain clamping laser signal (GC laser signal), wherein said Fabry-Perot cavity is formed by a pair of optical mirrors in outer parts of the input terminal and the output terminal of the RFM; and
   a pump being located between the output mirrors of the Raman laser signal and the GC laser signal and generating the Raman laser signal and the GC laser signal while pump light passes through the RFM.

* * * * *